US010091528B2

(12) United States Patent
MacInnis et al.

(10) Patent No.: US 10,091,528 B2
(45) Date of Patent: *Oct. 2, 2018

(54) METHOD AND SYSTEM FOR SCALABLE VIDEO COMPRESSION AND TRANSMISSION

(75) Inventors: Alexander G. MacInnis, Los Altos Hills, CA (US); Lei Zhang, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 644 days.

This patent is subject to a terminal disclaimer.

(21) Appl. No.: 12/770,524

(22) Filed: Apr. 29, 2010

(65) Prior Publication Data

US 2010/0278230 A1 Nov. 4, 2010

Related U.S. Application Data

(60) Provisional application No. 61/174,569, filed on May 1, 2009, provisional application No. 61/179,533, filed on May 19, 2009.

(51) Int. Cl.
*H04N 7/12* (2006.01)
*H04N 19/59* (2014.01)
(Continued)

(52) U.S. Cl.
CPC .......... *H04N 19/59* (2014.11); *H04N 19/132* (2014.11); *H04N 19/146* (2014.11);
(Continued)

(58) Field of Classification Search
None
See application file for complete search history.

(56) References Cited

U.S. PATENT DOCUMENTS 5,548,324 A 8/1996 Downs et al.
6,600,836 B1 * 7/2003 Thyagarajan et al. ........ 382/239
(Continued)

OTHER PUBLICATIONS

U.S. Office Action for U.S. Appl. No. 12/769,458 dated Nov. 7, 2013.
(Continued)

*Primary Examiner* — Mohammed S Rahaman
(74) *Attorney, Agent, or Firm* — Foley & Lardner LLP

(57) ABSTRACT

A video processing device receives video data and transmits the video to a display device at a new bit rate that is dynamically adjusted based on variable conditions. The new bit rate is adjusted, at least, by scaling the video and/or a residual image and may be adjusted utilizing compression functions, compression parameters, scale factor, frame rate, color space, and chroma sub-sampling. The display receives video at the adjusted new bit rate and decompresses the video in accordance with corresponding adjustments in the video processing device. Bit rate determination is based on variable operating conditions, display information, image quality, BER, packet error, SNR, desired level of compression, energy consumption, link congestion and display capabilities. Video may be scaled prior to compression. The video may comprise a frame and/or a slice. DPCM, H.264, AVC, transform compression and scaling may be utilized. The display may utilize intra-frame spatial prediction.

20 Claims, 5 Drawing Sheets

(51) Int. Cl.
  *H04N 19/172* (2014.01)
  *H04N 19/61* (2014.01)
  *H04N 19/132* (2014.01)
  *H04N 19/146* (2014.01)
  *H04N 19/174* (2014.01)
  *H04N 19/184* (2014.01)
  *H04N 19/587* (2014.01)
  *H04N 19/85* (2014.01)

(52) U.S. Cl.
  CPC ......... *H04N 19/172* (2014.11); *H04N 19/174* (2014.11); *H04N 19/184* (2014.11); *H04N 19/587* (2014.11); *H04N 19/61* (2014.11); *H04N 19/85* (2014.11)

(56) References Cited

U.S. PATENT DOCUMENTS

| | | | |
|---|---|---|---|
| 6,628,300 B2* | 9/2003 | Amini et al. | 345/660 |
| 6,671,322 B2* | 12/2003 | Vetro et al. | 375/240.16 |
| 7,453,937 B2* | 11/2008 | Henocq et al. | 375/240.03 |
| 7,496,236 B2* | 2/2009 | Fogg | 382/233 |
| 7,649,938 B2 | 1/2010 | Chen et al. | |
| 7,797,454 B2 | 9/2010 | Apostolopoulos et al. | |
| 7,920,747 B2* | 4/2011 | Gabriel et al. | 382/232 |
| 2003/0018802 A1* | 1/2003 | Romanik | H04L 29/06 709/234 |
| 2003/0026477 A1* | 2/2003 | Ishiga | 382/166 |
| 2003/0039408 A1* | 2/2003 | Smith | 382/298 |
| 2003/0138041 A1 | 7/2003 | Moore et al. | |
| 2005/0002453 A1 | 1/2005 | Chang et al. | |
| 2005/0123058 A1 | 6/2005 | Greenbaum et al. | |
| 2007/0274381 A1* | 11/2007 | Li et al. | 375/240.01 |
| 2008/0084927 A1* | 4/2008 | Rosenzweig et al. | 375/240.02 |
| 2009/0019178 A1 | 1/2009 | Melnyk et al. | |
| 2009/0168894 A1* | 7/2009 | Marpe et al. | 375/240.24 |
| 2009/0241147 A1* | 9/2009 | Kim | H04L 1/203 725/62 |
| 2010/0080283 A1* | 4/2010 | Ali et al. | 375/240.01 |
| 2010/0189183 A1* | 7/2010 | Gu et al. | 375/240.28 |
| 2010/0232497 A1 | 9/2010 | MacInnis | |
| 2010/0278271 A1 | 11/2010 | MacInnis | |

OTHER PUBLICATIONS

U.S. Office Action for U.S. Appl. No. 12/769,458 dated Feb. 24, 2014.
U.S. Office Action for U.S. Appl. No. 12/769,458 dated Mar. 29, 2013.
U.S. Office Action on U.S. Appl. No. 12/769,458 dated Oct. 3, 2014.
U.S. Notice of Allowance on U.S. Appl. No. 12/769,458 dated Mar. 12, 2015.

* cited by examiner ately adjust bit rates for wired or wireless communication, based on variable conditions, by dynamically adjusting bits per pixel and/or pixels per frame, in accordance with an embodiment of the invention.

METHOD AND SYSTEM FOR SCALABLE VIDEO COMPRESSION AND TRANSMISSION

CROSS-REFERENCE TO RELATED APPLICATIONS/INCORPORATION BY REFERENCE

This application makes reference to, claims priority to, and claims the benefit of:
U.S. Provisional Application Ser. No. 61/174,569, which was filed on May 1, 2009; and
U.S. Provisional Application Ser. No. 61/179,533, which was filed on May 19, 2009.

This application also makes reference to:
U.S. patent application Ser. No. 12/769,458, which was filed on Apr. 28, 2010; and
U.S. patent application Ser. No. 12/720,273, which was filed on Mar. 9, 2010.

Each of the above stated applications is hereby incorporated herein by reference in its entirety.

FIELD OF THE INVENTION

Certain embodiments of the invention relate to communication systems. More specifically, certain embodiments of the invention relate to scalable video compression and transmission.

BACKGROUND OF THE INVENTION

Digital video capabilities may be incorporated into a wide range of devices, for example, digital televisions, digital direct broadcast systems, digital recording devices, gaming consoles, digital cameras and many various handheld devices such as mobile phones. Video data may be received and/or may be generated by a video processing device and may be delivered to a display device, for example, a set-top-box, a computer, a camera or a disk player may process video data and may communicate the results to a to a display device. Uncompressed video may be transmitted from a video processing unit to a display or television using various media and/or formats.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for scalable video compression and transmission.

Various advantages, aspects and novel features of the present invention, as well as details of an illustrated embodiment thereof, will be more fully understood from the following description and drawings.

DETAILED DESCRIPTION OF THE INVENTION

Figure 1:
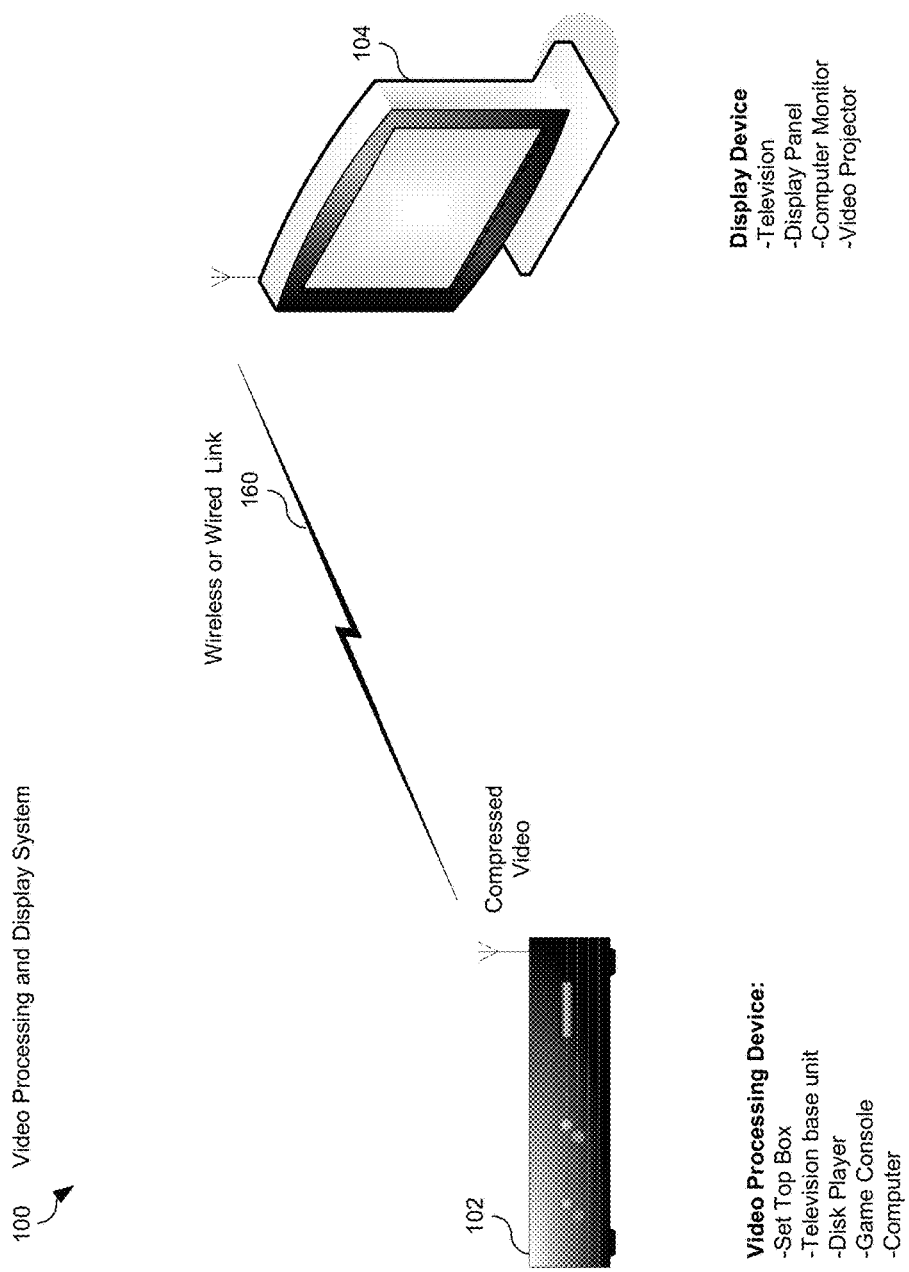
FIG. 1 is a block diagram illustrating an exemplary video processing and display system that is operable to dynamically adjust bit rates for communication of compressed video via a wired or wireless link, in response to variable conditions in the link, in accordance with an embodiment of the invention.

Certain embodiments of the invention can be found in a method and system for scalable video compression and transmission. In accordance with various embodiments of the invention, a video processing device that is communicatively coupled to a display device via a communication link may be operable to receive video data from a video source. The video processing device may dynamically determine a new bit rate for transmitting at least a portion of the received video data via the communication link. For at least a portion of the received video data, the video processing device may dynamically adjust a current bit rate to the dynamically determined new bit rate, at least, by scaling the received video data. The video processing device may transmit the portion of received video, to the display device via the communication link at the dynamically determined new bit rate. The current bit rate may be dynamically adjusted to the dynamically determined new bit rate by compressing and/or scaling the portion of received video data and/or a corresponding residual image, utilizing one or more of a dynamically adjusted compression function, a dynamically adjusted compression parameter, a dynamically adjusted image scale factor, a dynamically adjusted frame rate, a dynamically adjusted color space, and a dynamically adjusted chroma sub-sampling rate. The display device may receive the transmitted portion of the received video data and/or may receive the residual image, via the communication link at the dynamically determined new bit rate. The display device may decompress the portion of the received video data and/or the received residual image, utilizing one or more of a dynamically adjusted decompression function, a dynamically adjusted compression parameter, a dynamically adjusted scale factor, a dynamically adjusted frame rate, a dynamically adjusted color space and a dynamically adjusted chroma sub-sampling rate, in accordance with corresponding dynamic adjustments in the video processing device. The dynamically determined new bit rate may be determined based on one or both of variable operating conditions and information received from the display device. The dynamically determined new bit rate may be determined based on one or more of a displayed video image quality, a bit error rate, a packet error rate and transmission signal to noise ratio, that may be determined for prior transmissions of at least a portion of the received video data or other data via the communication link. The new bit rate may be dynamically determined based on one or more of a desired level of compression for the portion of received video data, energy consumption, congestion on the communication link, variable operating conditions of the communication link and capabilities of the display device. The number of pixels per frame of the portion of received video data may be scaled prior to compressing the portion of received video data in accordance with the dynamically determined new bit rate. The portion of received video data may comprise one or more of a video frame and a slice of contiguous horizontal rows or partial rows of pixels in a video frame. The portion of the received video data may be compressed utilizing one or more of DPCM compression, transform compression, H.264 compression, Advanced Video Coding (AVC), no compression, and video scaling in accordance with the dynamically determined new bit rate. The display device may utilize intra-frame spatial prediction. The display device may be operable to utilize inter-frame prediction. In this manner, a video processing device may be operable to respond to variable and/or unpredictable operating conditions by dynamically adjusting scaling and/or compression functions and parameters for processing the received video content. A compression parameter may comprise a quantization parameter and/or may comprise the number of compressed bits utilized to represent a pixel, for example.

FIG. 1 is a block diagram illustrating an exemplary video processing and display system that is operable to dynamically adjust bit rates for communication of compressed video via a wired or wireless link, in response to variable conditions in the link, in accordance with an embodiment of the invention. Referring to FIG. 1, there is shown a video processing and display system 100 that comprises a video processing device 102, a display device 104 and a wireless link 160.

Although a wireless communication link 160 is illustrated between the video processing device 102 and the display device 104, the invention is not limited in this regard and any suitable wired or wireless link may be utilized without deviating from the scope of the invention.

The video processing device 102 may comprise suitable logic, circuitry, interfaces and/or code that may be operable to receive and/or generate video information from a video source, may process the video information and may communicate the processed video information to the display device 104. The processing may comprise compression and/or scaling of the video information. The video information may comprise video content and/or may comprise control information. The control information may be utilized by the display device 104 for controlling decompression and/or scaling of the video content, for example. The video information may be referred to as video and/or video data. The video processing device 102 may comprise, for example, a set top box (STB), a television base unit, a disk player such as a DVD or Blu-ray disk player, a portable media player, a game console, and/or a computer. The video processing device 102 may be operable to dynamically adjust processing methods and/or processing parameters in order to respond to variable operating conditions in the communication system 100 and/or in aspects of the video information. For example, a bit rate utilized for transmission of video data via the wireless link 160, may be adjusted based on operating conditions in the wireless link 160.

The video processing device 102 may be operable to determine an appropriate transmission bit rate which may be referred to as an available bit rate, for wireless transmissions via the wireless link 160. The available transmission bit rate may be determined based on performance quality or on successfulness of prior wireless communication via the wireless link 160. For example, the video processing device 102 may be operable to receive information about quality, success and/or failure of prior wireless communication, from the display device 104. Moreover, the video processing device 102 may adjust a transmission bit rate for wireless communication via the wireless link 160 for other reasons, for example, to save energy or to allocate bandwidth to communication of other information. A bit rate that is determined to be available for transmission via the wireless link 160 and/or is utilized for transmitting video data via the wireless link 160 to the display device 104, may be referred to as a transmission bit rate and/or data rate, a wireless transmission bit rate and/or data rate and a throughput bit rate and/or data rate and may be expressed in bits per second (bps).

The video processing device 102 may be operable to adjust compression and/or scaling functions in order to raise or lower a transmission bit rate in accordance with a determined available bit rate in the wireless link 160. Furthermore, the video processing device 102 may be operable to dynamically adjust one or more of a compression scheme, compression parameters, for example, quantization parameters or a compressed video bits per pixel rate, a scale factor, a frame rate, a color space and/or a chroma sub-sampling function, for example, in order to raise or lower the transmission bit rate in accordance with a determined available transmission bit rate for the wireless link 160. The terms frame, picture and/or image may be utilized interchangeably to refer to a frame, a field such as a top or bottom interlaced video field, a progressive video frame, a picture or an image, for example.

The display device 104 may comprise suitable logic, circuitry, interfaces and/or code that may be operable to receive wireless video signals comprising a dynamically changing bit rate, from the video processing device 102. The display device 104 may be operable to process the received video information in accordance with the dynamically adjusted processing functions performed by the video processing device 102. For example, decompression scheme, compressed video format, scaling, frame rate and/or color space may be adjusted dynamically in the display device 104, based on the corresponding dynamically changing functions performed by the video processing device 102. The display device 104 may be operable to display the decompressed and/or scaled video. The display device 104 may comprise one or more of a television, a display panel, a computer monitor and/or a video projector, for example.

The wireless link 160 may be operable to carry video data between the video processing device 102 and the display device 104. The video processing device 102 and/or the display device 104 may be operable to communicate via the wireless link 160 based on any suitable standard and/or non-standard wireless technology. For example, the video data may be communicated by the video processing device 102 utilizing Bluetooth, WLAN, WiFi, cellular, WiMAX, Zigbee and/or IR wireless technology. Notwithstanding, the invention is not limited with regard to any specific communication technology. For example, in various embodiments of the invention, the video processing device 102 and/or the display device 104 may be operable to communicate the video data via wired or optical technologies, for example, utilizing Ethernet, HDMI and/or the Internet.

The wireless link 160 may comprise variable and/or unpredictable operating conditions that may affect which transmission bit rate may reliably communicate the video data. For example, video signals transmitted via the wireless link 160 may undergo dynamic fading, multi-path delay, attenuation from antenna misalignment or signal blocking, noise and/or electromagnetic interference, for example, which may cause the capacity of wireless link 160, with regard to a data throughput rate or an effective bandwidth, to be reduced at times and/or to increase at other times. Also, network congestion and/or near/far receiver issues may affect the available data throughput rate. In this regard, a transmission bit rate on the wireless link 160 that may be determined to be effective in supporting a preferred video image quality on the display device 104, may change over time.

Compressed video that may be communicated via the wireless link 160 may be sensitive to data losses and/or to errors that may be incurred during wireless transmission. In some instances, the video processing device 102 may be operable to transmit the video information at a rate that is lower than its maximum capability in order to obtain a sufficiently low bit error rate (BER) and/or packet error rate (PER). For example, a lower bit rate may enable sufficient error correction functions to obtain a suitably low net BER or PER.

In operation, the video processing device 102 may receive video data from any suitable source, for example, a satellite or cable network or it may receive video data from a storage device such as a DVD, Blu-ray disk and/or memory drive. The video processing device 102 may be operable to process the video and may reliably deliver the video to the display device 104 via the wireless link 160. Operating conditions on the wireless link 160, for example, throughput capacity of the wireless link 160, may vary over time and may vary unpredictably. Bit rates utilized for wireless transmission of the video may be dynamically adjusted in response to the varying operating conditions on the wireless link 160 or elsewhere in the video processing and display system 100. For example, one or more of scale factor, compression scheme, compressed video bits per pixel format, a frame rate, a color space and/or chroma sampling, may be adjusted dynamically in response to the varying operating conditions and in response to other factors, such as, the type of video data that is being processed. Various compression schemes for example, DPCM and transform coding, may be utilized by the video processing device 102 to reduce the number of bits per pixel dynamically, and thus, reduce the transmission bit rate dynamically. A compression scheme may be referred to as a compression function. The transmission bit rate comprises the number of bits per second (bps) that may be utilized to wirelessly communicate compressed or uncompressed video information to the display device 104. In various embodiments of the invention, the video processing device 102 may be operable to provide reliable and good quality video transmission when a throughput capability of the wireless link 160 is low, and reliable, very high quality video transmission when a throughput capability of the wireless link 160 is high.

In an exemplary embodiment of the invention, in instances when only a fraction of a maximum bit rate can be transmitted reliably via the wireless link 160, for example, only 25% of a determined maximum bit rate, various factors such as compression function, modulation technique and/or forward error correction (FEC) scheme may be adjusted such that only the fraction of the maximum data rate is transmitted. Transmitting at the lower data rate reliably, may prevent wasting of transmission bandwidth on unreliable transmission at a higher rate data. By adapting the compression function in the video processing device 102 to operating conditions and/or to types of video information being transmitted, latency and/or overall subjective quality of the displayed video in the display device 104, may be improved.

Figure 2:
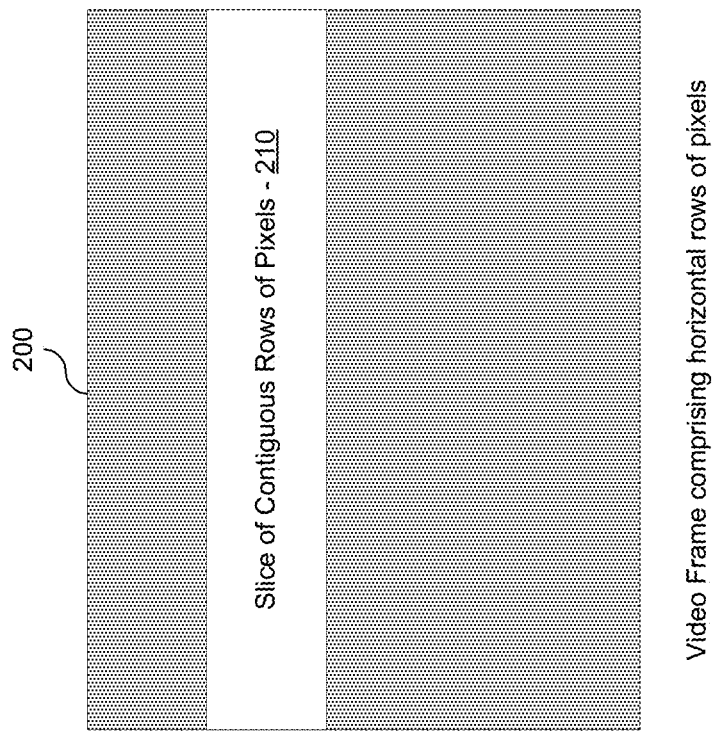
FIG. 2 is a block diagram illustrating an exemplary video frame comprising one or more portions of the video frame, in accordance with an embodiment of the invention.

FIG. 2 is a block diagram illustrating an exemplary video frame comprising one or more portions of the video frame, in accordance with an embodiment of the invention. Referring to FIG. 2, there is shown a video frame 200 that may comprise one or more portions of the video frame such as a slice of pixels 210.

The video frame 200 may comprise a number of horizontal rows of pixels comprising a specified length, depending on frame size. The video frame 200 may comprise any suitable video and/or graphics picture, for example, the video frame 200 may comprise a top or bottom field of interlaced video or a progressive video frame for example. The size of the video frame 200 may indicate the number of pixels per frame and may be referred to as resolution or video picture size, for example. Scaling of the video frame 200, or a portion of the frame, may increase or decrease the number of pixels in the frame, and thus, may change the resolution. The video frame 200 or a portion of the frame may be scaled based on a scale factor. Exemplary frame parameters for the video frame 200 may comprise a resolution or frame size of 1920×1080, with a data format comprising 10 bits per sample in a red, green, blue (RGB) color space which may yield a data format comprising 30 bits per pixel. The exemplary video frame 200 may be wirelessly transmitted to the display device 104 at a frame rate of 60 frames per second (fps), for example. As wireless transmission bit rates are dynamically adjusted over time, a wide variety of frame parameters may be adjusted accordingly. In various embodiments of the invention, adjustments in transmission bit rate may be made on a sub-frame basis, for example, adjustments may occur that affect only a portion of a frame. A portion of the video frame 200 may be referred to as a slice. An exemplary slice 210, may comprise a number of contiguous horizontal rows of pixels, for example, 8 or 16 rows, however, the invention is not limited in this regard. For example, rows of pixels within the slice of pixels 210 may or may not span the full width of the video frame 200. The slice of pixels 210 may comprise a 16×16 macro block of pixels, for example. The frame 200 may comprise a plurality of slices and decisions regarding transmission bit rate and related parameters may be made for each slice.

In operation, the video processing device 102, described with respect to FIG. 1, may be operable to make decisions regarding wireless transmission bit rates on a slice by slice basis. The video processing device may be operable to adjust one or more of compression scheme, compressed bits per pixel format, scale factor, color space and/or chroma sub-sampling in order to reliably transmit the frame 200 to the display device 104. For example, the frame parameters may be adjusted on a per frame basis, a per slice basis and/or on a per multiple frames basis.

Figure 3:
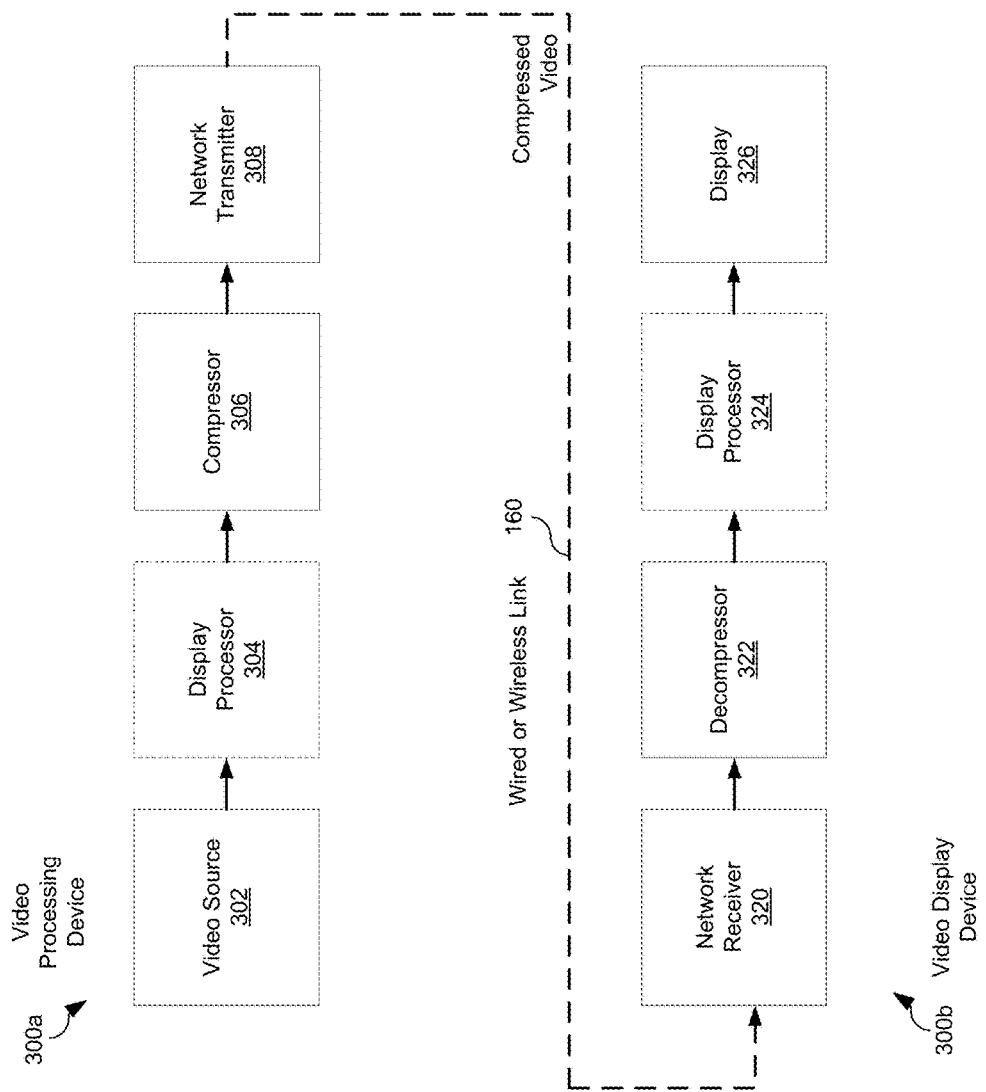
FIG. 3 is a block diagram illustrating an exemplary video processing and display system that is operable to dynamically adjust bit rates for wired or wireless communication, based on variable conditions, by dynamically adjusting bits per pixel and/or pixels per frame, in accordance with an embodiment of the invention.

FIG. 3 is a block diagram illustrating an exemplary video processing and display system that is operable to dynamically adjust bit rates for wired or wireless communication, based on variable conditions, by dynamically adjusting bits per pixel and/or pixels per frame, in accordance with an embodiment of the invention. Referring to FIG. 3, there is shown a video processing device 300a that comprises a video source 302, a display processor 304, a compressor 306 and a network transmitter 308. In addition, there is shown a display device 300b, that comprises a network receiver 320, a decompressor 322, a display processor 324 and a display 326. The wireless link 160 is also shown.

The video processing device 300a may be similar to and/or substantially the same as the video processing device 102. The display device 300b may be similar to and/or substantially the same as the display device 104. The wireless link 160 is described with respect to FIG. 1. Although the wireless link 160 is illustrated between the video processing device 300a and the display device 300b, the invention is not limited in this regard and any suitable wired or wireless link may be utilized between the devices without deviating from the scope of the invention. The video processing device 300a, the display device 300b and the wireless link 160 may comprise the video processing and display system 100.

The video source 302 may comprise suitable logic, circuitry, interfaces and/or code that may be operable to generate video that comprises a specified video picture size, a data format and/or frame rate. For example, the video source may generate video frames comprising a video picture size of 1920×1080 pixels, with a data format comprising 10 bits per sample RGB and 30 bits per pixel, and a frame rate of 60 frames per second. However, the invention is not limited in this regard and any suitable video picture size, data format and/or frame rate may be utilized. The generated video may be communicated to the display processor 304 and/or to the compressor 306.

In various exemplary embodiments of the invention, the video processing device 300a may comprise the display processor 304 which may comprise suitable logic, circuitry, interfaces and/or code that may be operable to receive and process the video generated by the video source 302. For example, the display processor 304 may be operable to scale video picture size, filter video pictures, sharpen video images, change or convert the color space, and/or add graphics. The display processor 304 may be operable to communicate the processed video to the compressor 306.

The compressor 306 may comprise suitable logic, circuitry, interfaces and/or code that may be operable to receive video from the display processor 306 and/or from the video source 302 and may compress the video according to a specified compression scheme and a specified compressed data format comprising a specified number of bits per pixel. The compressor 306 may be operable to dynamically change a compression scheme and/or to dynamically change a compressed data format to enable wireless transmission at variable transmission bit rates. Exemplary compression schemes may comprise transform coding such as H.264 (Advanced Video Coding (AVC)) and/or MPEG 4 or coding such as DPCM, that may be compliant with the JPEG-LS standard, for example, and/or discrete cosign transform (DCT) coding, for example. Notwithstanding, the invention is not limited in this regard and any suitable compression scheme may be utilized. U.S. patent application Ser. No. 12/720,273, filed on Mar. 9, 2010, entitled "Lossless and Near-Lossless Image Compression," which is incorporated herein by reference in its entirety, provides an exemplary DPCM coding scheme that may be utilized by the compressor 306. In various embodiments of the invention, DPCM may be utilized for transmission at a higher bit rate, and transform coding may be utilized at a lower bit rate, however, the invention is not limited in this regard.

The compressor 306 may comprise suitable logic, circuitry, interfaces and/or code that may be operable to reduce and/or to increase the number of bits that are utilized to represent a pixel in a video image or frame. The number of bits per pixel may be changed dynamically, as needed, to adjust a transmission bit rate. In various exemplary embodiments of the invention, the compressor 306 may also comprise suitable logic, circuitry, interfaces and/or code that may be operable to scale a video frame in order to change its size and/or resolution. The compressor 306 may generate a compressed and/or scaled video bit stream and may communicate the compressed and/or scaled video bit stream to the network transmitter 308. In various embodiments of a compression/decompression scheme that may be utilized by the compressor 306 and the decompressor 322, inter-frame prediction, which may be referred to as temporal prediction, may not be utilized. For example, the decompressor 322 may not predict pixel values from a frame in a received compressed video bit stream, based on pixels in neighboring frames. Notwithstanding, in various embodiments of the invention, for example, when transform coding such as AVC is utilized, the decompressor 322 may utilize intra-frame prediction which may be referred to as spatial prediction. With spatial prediction, the decompressor 322 may predict pixel values in a frame utilizing other reconstructed pixels within the same frame.

The network transmitter 308 may comprise suitable logic, circuitry, interfaces and/or code that may be operable to receive a compressed video bit stream from the compressor 306 and transmit the video bit stream via the wireless link 160 to the network receiver 320 in the video display device 300b. The network transmitter 308 may be operable to transmit other information such as control information, concurrently with the compressed video bit stream. Moreover, the network transmitter 308 and/or the network receiver 320 may be operable to dynamically determine an available transmission data rate at which a video bit stream or a portion of the video bit stream may be reliably communicated. A new transmission data rate may be determined repeatedly for one or more video frames within the video bit stream and/or for one or more portions of a video frame within the video bit stream. For example, an available transmission data rate may be determined for each slice of a video frame. The determined transmission data rates may change dynamically during transmission of the video bit stream. The new transmission data rates may be determined based on network performance during and/or prior to transmitting and receiving the video bit stream.

The network receiver 320 in the display device 300b may comprise suitable logic, circuitry, interfaces and/or code that may be operable to wirelessly receive the compressed video bit stream from the network transmitter 308 and may communicate the compressed video bit stream to the decompressor 322. The display device 300b may be operable to wirelessly communicate information to the video processing device 102 via the wireless link 160 that may enable dynamic determination of available transmission data rates. Alternatively, the display device 300b may be operable to dynamically determine and transmit an available transmission data rate to the video processing device 102 to enable communication of video data via the wireless link 160. For example, the network receiver 320 may be operable to detect errors and/or measure performance of a received compressed video bit stream. The network receiver 320 may be operable to estimate parameters of the received signal such as, for example, received signal strength or carrier to noise ratio. The detected errors and/or link performance may be utilized to determine an available transmission data rate. The display device 300b may communicate or may utilize, for example, bit error rate, packet error rate and/or signal to noise ratio measurements for the dynamic determination of an available transmission data rate. In some embodiments of the invention, the network receiver 320 may also be operable to request a re-transmission of one or more packets from the network transmitter 308, and may deliver received retransmitted packets of data to the decompressor 322.

The network receiver 320 and/or the decompressor 322 may be operable to store received video pictures. The stored video pictures may be utilized in instances when there is a failure in decoding a subsequently received video picture or a portion thereof. Furthermore, in instances when a video picture or a portion thereof is not transmitted by the video processing device 300a and/or is not received by the display device 300b, the stored video pictures may be utilized. In this regard, the stored video picture or a portion of the video picture may be displayed in place of an impaired or missing subsequent video picture or portion of a subsequent video picture. In some instances, the video data that is displayed from storage may not exhibit serious visual artifacts whereas utilization of the impaired video picture may cause serious visual artifacts to appear.

The decompressor 322 may comprise suitable logic, circuitry, interfaces and/or code that may be operable to receive a compressed video bit stream from the network receiver 320 and may be operable to perform functions on the video data that are inverse functions with respect to functions performed on the video data by the compressor 306. For example, in instances when the compressor 306 scales the video to a different size, the decompressor may scale it back to its original size. Alternatively, the decompressor may scale the video to a different size, for example, according to specifications determined for the display device 300b. The decompressor 322 may be operable to decompress the compressed video bit stream to an increased bit per pixel format. The decompression and/or scaling functions performed by the decompressor 322 may change dynamically over time as the transmission bit rate from the video processor 300a changes. The decompressed video bit stream output from the decompressor 322 may be sent to the display processor 324 or to the display 326.

The display device 300b may comprise the display processor 324. The display processor 324 may comprise suitable logic, circuitry, interfaces and/or code that may be operable to receive a decompressed video bit stream from the decompressor 322 and may process the decompressed video bit stream by, for example, one or more of scaling, sharpening, adjusting the color space and/or by compensating for attributes of the display 326. The output of the display processor 324 may be sent to the display 326. The display processor 324 may comprise storage that may enable the display processor to send the decompressed video to the display 326, at a frame rate that differs from the frame rate received by the display processor from the decompressor 322.

The display 326 may comprise suitable logic, circuitry, interfaces and/or code that may be operable to receive a decompressed video bit stream from the decompressor 322 and/or from the display processor 324 and may display received video frames at a specified frame rate. The display 326 may comprise any suitable display screen technology such as, for example, a liquid crystal display or plasma display.

In operation, the compressor 306 may compress video data such that there is some loss of image fidelity; or it may perform lossless compression and may preserve image fidelity. In various instances, the compressor 306 may not compress the video at all. The compressor 306 may produce a video bit stream which may comprise video content and/or control information. The control information may be utilized by the decompressor 322, for example, to determine which functions the compressor and/or the display processor 304 may have utilized when processing the video content in the video bit stream. For example, the functions may comprise a compression scheme, a compressed data format, a chroma sub-sampling rate and/or a scaling factor. In this manner, the decompressor 322 may perform an inverse of the functions that were performed by the compressor 306 and/or the display processor 304. The video bit stream produced by the compressor 306 may be communicated to the network transmitter 308.

The video source 302 may be operable to generate video data. In various embodiments of the invention where the video processing device 300a comprises a display processor, the video source 302 may be operable to communicate the video data to the display processor 304. The display processor 304 may be operable to process the video data. For example the display processor 304 may be operable to scale a video picture size, filter video pictures, sharpen video images in the video data, change or convert the color space, and/or add graphics to the video images. The display processor 304 may be operable to communicate the processed video data to the compressor 306. In various embodiments of the invention, for example, when the video processing device 300a does not comprise a display processor, the video source 302 may communicate the generated video data to the compressor 306. The compressor 306 may be operable to receive the video data from the video source 302 or from the display processor 304 and may compress the video data in accordance with dynamically changing control information received from the network transmitter 308. In various embodiments of the invention, the compressor 306 may be operable to scale the video data. The compressor 306 may repeatedly receive requests from the network transmitter 308 for dynamically variable and/or unpredictable transmission bit rates. The transmission bit rates may be determined based how much data throughput the video processing and display system 100 and/or the wireless link 160 may be capable of supporting at a specified time and/or for a specified video image quality, for example. The compressor 306 may change various compression and/or scaling parameters such that the transmission bit rate from the network transmitter 308 to the network receiver 320, may comply with the transmission bit rate that was requested by the transmitter 308. The compressor 306 may notify the transmitter 308 when the changes are implemented.

In various instances when an available throughput capability for transmissions via the wireless link 160, falls to a lower level, the compressor 306 may reduce the number of bits per pixel to accommodate the lower available throughput rate. In instances when the available throughput rate drops to a level that may impair a perceived video image quality, the compressor 306 may be operable to scale the frame to a smaller size and may increase or decrease the bits per pixel of the scaled frame. The smaller size frame may reduce the resolution of a reconstructed frame in the display device 300b and may enable an increased number of bits per pixel of the smaller frame. Adjustments such as these may enable reliable transmission and may provide a better subjective image quality or user experience. For example, for a 1920×1080, high definition video frame size, the number of compressed bits per pixel may range from approximately 15 to 2 over a range of performance levels of the wireless link 160. At approximately 3 or 4 bits per pixel, artifacts may be perceived by a viewer. Rather than lowering the bits per pixel to a level where artifacts may be visible, the compressor 306 may first scale the frame size, for example, to 1280×720 or to 960×540, and compress the result. This scaling may enable the compressor 306 to utilize a greater number of bits per pixel for a given available transmission data rate. The loss of resolution due to scaling may be subjectively preferable to a viewer than the artifacts perceived at a lower bit per pixel rate. The scaling may be performed dynamically, for example, on a frame by frame basis or on a slice by slice basis, for example. In this regard, a decision may be made on each frame or on each slice of a specified size as to whether one or both of the bits per pixel and the pixels per frame or scale factor should be increased and/or decreased.

The compressor 306 may provide an indication to the network transmitter 308 on a slice by slice basis or, on a frame by frame basis, for example, which rate and/or which scale factor is being utilized. The network transmitter 308 may communicate to the network receiver 320, which rate is being utilized and/or may communicate other information for decompressing, scaling and/or processing the video data.

The decompressor 322 may be operable to decompress each slice of a video frame according to its dynamically variable compressed data format, bits per pixel rate and/or scale factor. For example, in instances when the decompressor 322 receives a plurality of video frame slices that are compressed with DPCM at 15 bits per pixel with a scale factor of 1 followed by a plurality of frame slices with a scale factor of ½ that are compressed with transform coding at 4 bits per pixel, the decompressor 322 may decode and scale each slice appropriately and may reconstruct the frame with the decoded slices. The decompressor 322 may communicate the decompressed and/or scaled video data to the display processor 324 for additional video processing such as for filtering, sharpening, color space conversion and/or graphics application. Alternatively, it may communicate the decompressed and/or scaled video data to the display 326. The display 326 may be operable to illuminate the decompressed pixels on a display screen.

Figure 4:
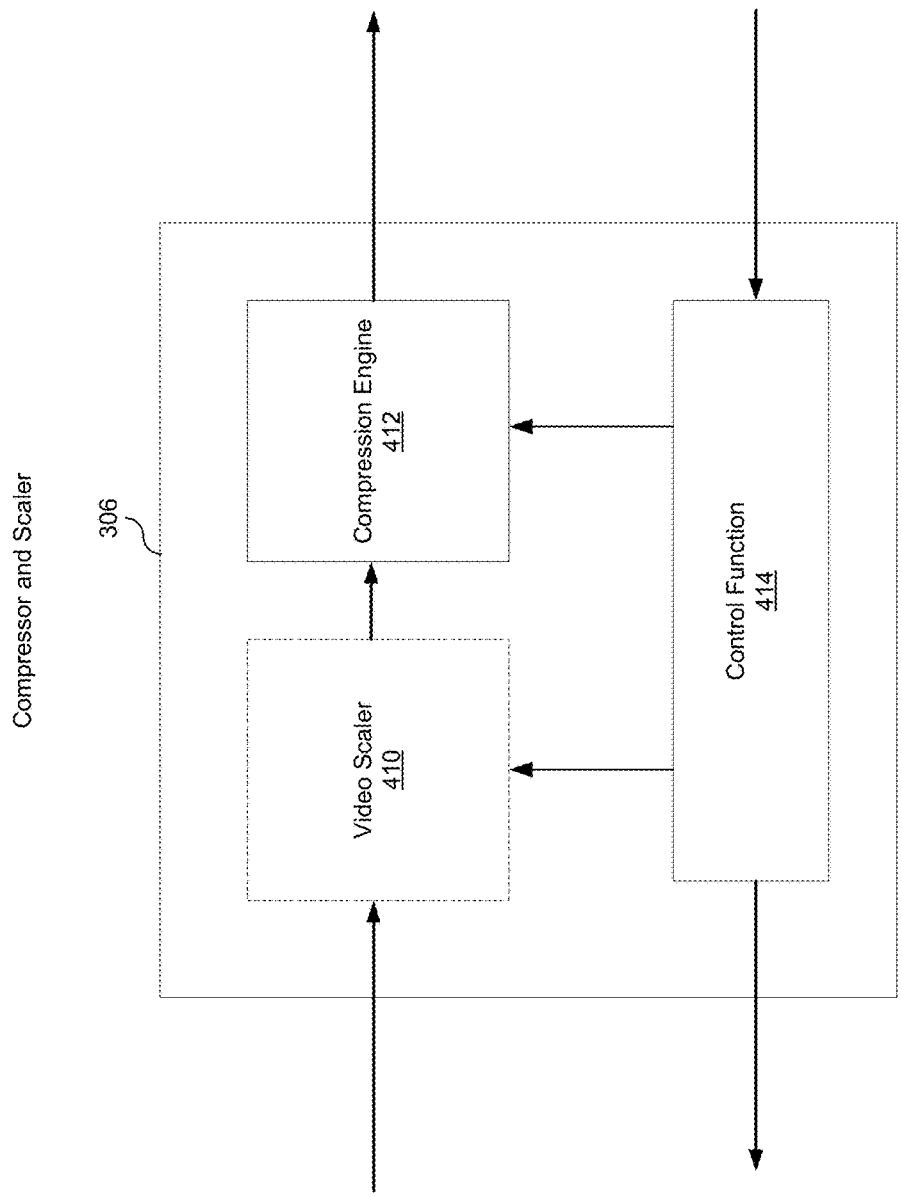
FIG. 4 is a block diagram illustrating an exemplary compressor that is operable to perform one or both of video compression and video frame scaling functions to adjust to variable bit transmission rates, in accordance with an embodiment of the invention.

FIG. 4 is a block diagram illustrating an exemplary compressor that is operable to perform one or both of video compression and video frame scaling functions to adjust to variable transmission bit rates, in accordance with an embodiment of the invention. Referring to FIG. 4, there is shown, the compressor 306 which comprises a video scaler 410, a compression engine 412 and a control function 414. The compressor 306 is described with respect to FIG. 3.

In various exemplary embodiments of the invention, the compressor 306 may comprise a video scaler 410, which may be operable to dynamically perform a scale function to adjust the size of a video frame. The number of pixels in a video frame may be reduced and/or may be increased, for example, prior to compression. In various embodiments of the invention, scaled video data may be scaled and may not be compressed. The display device 300b may be operable to scale a received video frame back to its original resolution or to a different resolution. In other exemplary embodiments that may comprise the display processor 304, for example, the display processor 304 may comprise the video scaler 410 and/or may perform the scale function in the video processing device 300a. The video scaler 410 may be controlled by the control function 414. The scale function may be adjusted dynamically for each frame or for each slice.

The control function 414 may comprise suitable logic, circuitry, interfaces and/or code that may be operable to dynamically instruct the video scaler 410 to scale a video frame or portion thereof to a smaller size than a current video frame size and/or to instruct the compression engine 412 to utilize a specified compression scheme or a specified compressed bit rate. The control function 414 may repeatedly receive control information from the network transmitter 308, for example. The received control information may indicate and/or may request a bit rate, at which the network transmitter 308 can presently support transmission of a video bit stream over the wireless network 160. Based on the received bit rate information, the control function 414 may dynamically determine an appropriate compressed bit per pixel rate, a scale factor, one or more compression parameters, a compression scheme, a color space and/or a color sub-sample rate, for example. The compression parameters may comprise quantization parameters, for example. The received bit rate information may apply to a frame, a plurality of frames and/or a portion of a frame, such as a slice of contiguous pixel rows.

The compression engine 412 may comprise suitable logic, circuitry, interfaces and/or code that may be operable to compress output received from the video scaler 410 and/or may be operable to compress video data that is not scaled. The compression engine 412 may be operable to utilize any suitable compression function or compression scheme as described with respect to FIG. 3, for example. The compression engine 412 may be operable to handle any suitable frame size, compressed data format, frame rate, color space and/or chroma sub-sampling. In various embodiments of the invention, the compression engine 412 may utilize the compression function disclosed in U.S. patent application Ser. No. 12/720,273, filed on Mar. 9, 2010, entitled "Lossless and Near-Lossless Image Compression," however; the invention is not limited with regard to which compression function is utilized. The compression engine 412 may be operable to dynamically convert a data format and/or a number of bits per pixel in a frame of video data or a portion of a frame of video data, to a different data format and/or a different number of bits per pixel. The compressor engine 412 may be operable to change data format and/or the number of bits per pixel on a slice by slice basis, a frame by frame basis or for a plurality of frames; the invention is not limited in this regard.

The compressor 306 may be operable to provide information in its output data stream that may indicate which scaling factor, data format, bits per pixel rate and/or compression functions were performed on a corresponding input data stream or subsequent input data stream. In this manner, the network receiver 320 and the decompressor 322 may perform inverse functions on the compressor 306 output data stream to reconstruct or recover data corresponding to the compressor 306 input data stream.

In operation, in an exemplary embodiment of the invention, an original video frame size and data format may be expressed as 1920×1080p60, RGB30 which may comprise a progressive frame size of 1920×1080 pixels, a frame rate of 60 frames per second and an RGB color space with an original data format comprising 10 bits per color sample or equivalently, 30 bits per pixel. The video scaler 410 may convert the original video frame size to 960×540p60 which may comprise half of the size of the original frame in each dimension, with a frame rate of 60 frames per second. The compression engine 412 may compress the scaled video frame data to a compressed format.

In an exemplary embodiment of the invention, for example when a budget for buffer space may permit, the compressor 306 and/or the control function 414 may determine to adjust a video frame rate. For example, one or more 1920×1080p60 frames which may comprise a frame rate of 60 frames per second (fps) may be converted to 1920× 1080p30 at 30 fps. Such a conversion may be performed by compressing only every other frame. Conversion to a lower frame rate may necessitate that the compressor 306 and/or the network transmitter 308, comprise a buffer large enough to store compressed bits so that the compressed bits representing one frame may be transmitted in 1/30th of a second rather than in 1/60th of a second. The display device 326 may handle frames that undergo a corresponding frame rate conversion, back to 60 fps, for example. The display device 326 may need a similar buffer to store the decompressed pictures. The display device 326 may display each frame twice to convert the 30 fps video data to 60 fps. Alternatively, the decompressor 322 may decompress each video frame twice to perform the frame rate conversion from 30 to 60 fps and it may utilize compressed buffer space to accommodate such a function.

In instances when the video processing and display system 100 can reliably support a transmission bit rate that is sufficient to transmit video in its original size and format and at a bits per pixel rate that is sufficient for a desired displayed video image quality, the compressor 306 may determine not to scale the video. The compressor 306 may compress the video to a bit rate, such that it is equal to or less than an available transmission bit rate and such that it is sufficiently high for lossless or near lossless compression. For example, 1920×1080p60 RGB30 video may be compressed with very high quality to 10 bits per pixel. In this example, the resulting transmission data rate, utilizing horizontal and vertical blanking intervals, may be approximately 1.244 Gbps.

In instances when the network transmitter 308 and/or the network receiver 320 dynamically indicate or request an available wireless transmission bit rate that is not sufficient to transmit video data in its current frame size and/or compressed data format for a specified quality, the compressor 306 may dynamically determine that the video scaler 410 may scale the video frame to a smaller size, and optionally, may convert the scaled video data to a different chroma sub-sampling format. For example, 1920×1080p60 RGB30 video may be scaled and converted to 960×540p60 YUV422 at 16 bits per pixel. The result of this operation may be compressed to a suitable bit rate, for example 8 bits per pixel. Alternatively, the frame size may be scaled while the chroma sub-sampling format may not change, for example, when converting from RGB30 to RGB24. The result of scaling video data and chroma sub-sampling format conversion may yield a reduction in the data rate of the video, prior to compression. For example, in instances when video vertical and horizontal blanking intervals are utilized during transmission, 1920×1080p60 RGB30 original video data may have a wireless transmission data rate of approximately 3.73 Gbps and the corresponding converted video data of 960×540p60 YUV422 may have a wireless transmission data rate of approximately 497.7 Mbps which may be approximately 13.3% of the original data rate. The scaled and converted video may then be compressed by the compression engine 412, which may further reduce the wireless transmission data rate. For example, under conditions where the available wireless transmission data rate is very low such that a perceived quality of the video may otherwise be impaired, the compression engine 412 may compress the scaled and converted video to a compressed data rate such as 5 bits per pixel which may result in a data rate of approximately 155.5 Mbps which is approximately 4.2% of the original data rate.

Conversion of 1920×1080 video to 960×540, for example, may be performed with a good result utilizing a low cost video scaling function, for example. A number of line buffers that are utilized for vertical scaling may be a significant cost factor. For example, a suitable vertical scaler may have 4, 6 or 8 line buffers. High definition video with an original size of 1920×1080, progressive, when converted to 960×540, may look subjectively very similar to the original. Conversion may be performed with any scale factor. For example, 1920×1080 video may be scaled to 1280×720, utilizing a scale factor of ⅔ in each of the horizontal and vertical dimensions.

Video data may be successfully scaled to even smaller sizes, producing even lower pixels per frame rates and a corresponding lower compressed data rate. For example, video converted from an original RGB30 to YUV422 16 bits per pixel, may look subjectively very similar to the original. Furthermore, for example, video comprising a 5 bits per pixel compressed data rate may look subjectively similar to the original.

For the example data rate above of 155.5 Mbps which is approximately 12.5% of the data rate of 1.244 Gbps which corresponds to unscaled, unconverted 1920×1080p60 RGB30 video data that is compressed to 10 bits per pixel, data rates in a range of approximately 8:1 may be utilized. Over this 8:1 range, high quality video may be displayed in the display device 300b while the video processing and display system 100 may adapt to a broad range of network operating conditions.

The network transmitter 308 may indicate the availability of a transmission data rate that is higher than what the compressor 306 needs for high quality compression and transmission of video. In this regard, the compressor 306 may be operable to decide to transmit video at a lower rate than what is available. The compressor 306 may dynamically determine that it prefers a lower or higher data rate than what is available.

The compressor 306 may determine a preferred data rate that it will utilize based on a desired level of compression for a current video picture. For example, if an optimal data rate for a desired image quality of the current video picture is higher than the rate currently configured, the compressor 306 may request a higher data rate to the network transmitter 308. Similarly, if the current video picture needs only a lower data rate for a desired image quality than the currently configured data rate, the compressor 306 may request a lower data rate to the network transmitter 308, or it may utilize a lower data rate. In this manner, dynamic adjustment of a data rate utilized by the video compressor 306, in accordance with a desired level of compression for a video picture, may enable the network transmitter 308 to allocate a portion of network bandwidth to other functions, for example, to non-real-time data transmission.

During a time interval when a current video picture is being compressed, the network transmitter 308 may indicate to the compressor 306 that a new transmission bit rate is available. In such an instance, the compressor 306 may adjust a current compressed bits per pixel rate and may apply a new bits per pixel rate to the remainder of the current video picture. In some instances, a currently configured scale factor may not be adjusted at the same time that the compressed bits per pixel rate is adjusted, and may be adjusted after compression of the current video image is complete, for example. In this regard, the compressor 306 may adjust the scale of a subsequent video picture, as appropriate. In this manner, the compressor 306 may adapt more quickly to varying available transmission bit rates. Some degradation of the current video image may occur, while subsequent video pictures may comprise improved image quality, for example. Alternatively, a currently configured scale factor may be adjusted at the same time that the compressed bits per pixel rate is adjusted, and the adjusted rate may apply to a slice of a video frame, for example. In this manner, the compressor 306 may adapt more quickly to varying available transmission bit rates and it may result in improved video quality.

The compressor 306 may be operable to make different determinations of scaling factor, format conversion and compressed data bits per pixel according to different values of the available data throughput rate indicated by the network transmitter 310. Moreover, the compressor 306 may be operable to make different determinations of scaling factor, format conversion and compressed data bits per pixel in accordance with preferences of the video processing and display system 100 and/or the content of a video picture. For example, in instances when a video picture comprises graphics information, the control function 412 may determine not to convert a video picture formatted in RGB color space to the YUV422 color space, whereas in instances when a video picture does not comprise graphics content, the control function 412 may determine that an RGB formatted video picture should be converted to a YUV422 color space, for example, when the available throughput data rate is low.

The compressor 306 may be operable to scale an input video picture, compress the scaled picture, and decompress the compressed picture to generate a reconstructed video picture from the compressed scaled video picture. The reconstructed video picture may be scaled to the original size of the input picture. A difference may be determined between the input video picture and the scaled reconstructed video picture. The difference may be referred to as a residual image. The residual image may be compressed and transmitted via the wireless link 160 along with a compressed version of the scaled video picture. The compressed bits representing the residual image may be transmitted with less reliability than the scaled and/or compressed video picture. The decompressor 322 may perform a mirror image of the operations performed by the compressor 306, for example, decompression of the scaled video picture and scaling to the original video picture size. The decompressor 322 may also be operable to decompress and/or scale the residual image. The decompressed and/or scaled residual image may be added to the decompressed and/or re-scaled video picture. In instances when errors are detected in all or a portion of the compressed residual image, corresponding portions of the decompressed residual image may not be added to the decompressed scaled video picture.

Figure 5:
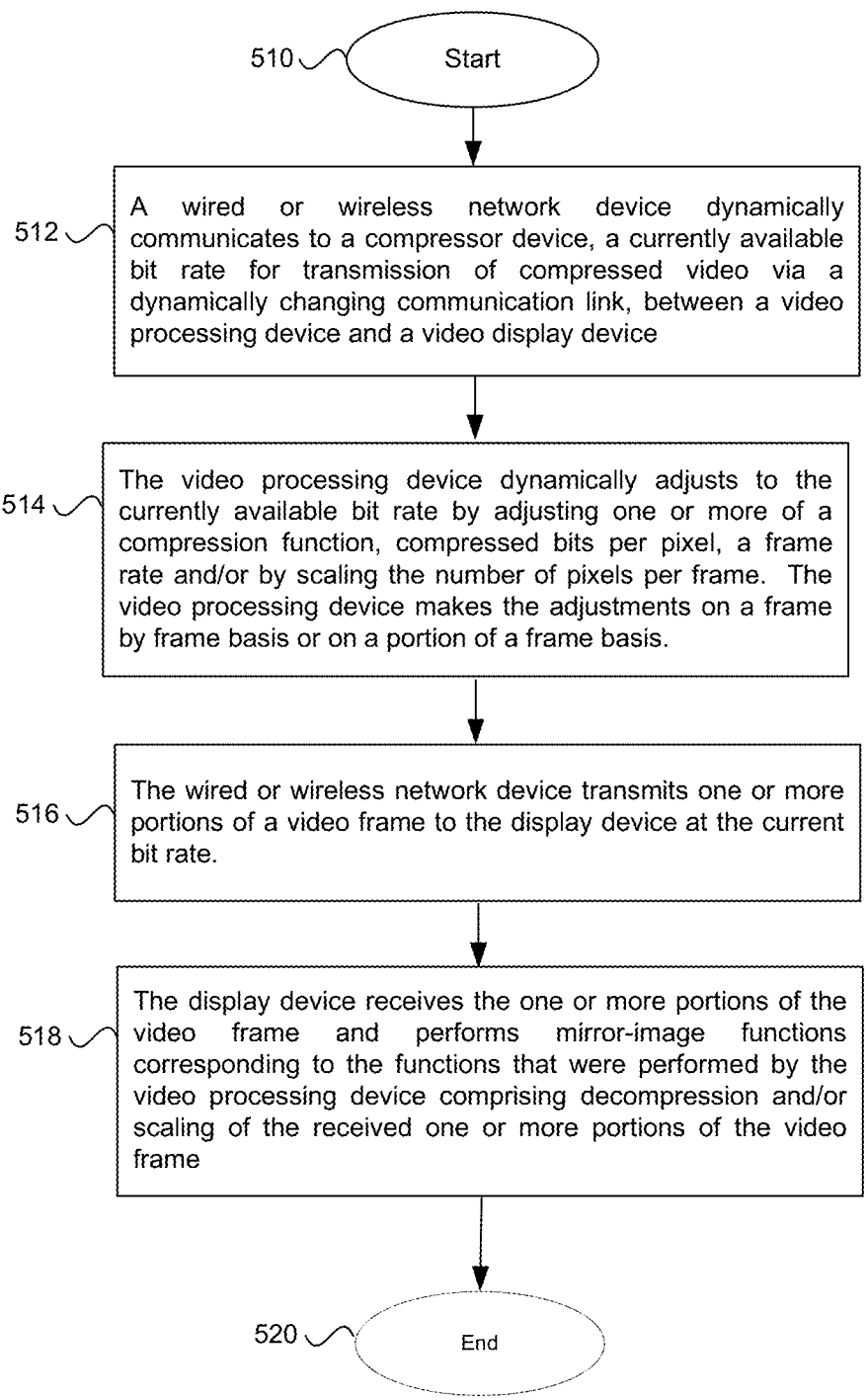
FIG. 5 is a flow chart illustrating exemplary steps for dynamically adjusting bit rates for communication of compressed video via a wired or wireless link, in accordance with an embodiment of the invention.

FIG. 5 is a flow chart illustrating exemplary steps for dynamically adjusting bit rates for communication of compressed video via a wired or wireless link, in accordance with an embodiment of the invention. Referring to FIG. 5, the exemplary steps may begin with step 510. In step 512, the network transmitter 308 may be operable to dynamically communicate to the compressor 306, an available bit rate for transmission of compressed video from the video processing device 300a to the display device 300b. In step 514, the video processing device 300a may be operable to dynamically adjust to the new available bit rate, for example, by adjusting one or more of a compression function, a number of compressed bits per pixel, a frame rate and/or by scaling the number of pixels per frame. The video processing device 300a may be operable to perform compression and/or scaling functions at the dynamically adjusted rates on one or more portions of a video frame or on a whole frame, for example. In step 516, the network transmitter 308 may be operable to transmit one or more portions of the compressed video frame to the display device 300b at the new transmission bit rate. In step 518, the display device 300b may be operable to receive the one or more portions of the compressed video frame and may be operable to perform mirror-image functions corresponding to the functions that were performed by the video processing device 300a. For example, the display device 300b may be operable to perform decompression and/or scaling at appropriate rates, appropriate compression schemes and/or appropriate scale factors on the received compressed one or more portions of the video frame and may display the decompressed video in the display 326. Step 520 may be the end of the exemplary steps.

In an embodiment of the invention, a video processing device 300a that is communicatively coupled to a display device 300b via a wireless link 160 may be operable to receive video data from a video source 302. The video processing device 300a may dynamically determine a new bit rate for transmitting at least a portion of the received video data via the wireless link 160 and may dynamically adjust a current bit rate of the received video data to the dynamically determined new bit rate, at least by scaling, the at least a portion of the received video data. The video processing device 300a may transmit the portion of received video and/or may transmit a corresponding residual image, to the display device 300b via the wireless link 160 at the dynamically determined new bit rate. The current bit rate may be dynamically adjusted to the dynamically determined new bit rate by compressing and/or scaling the portion of received video data and/or a corresponding residual image, utilizing one or more of a dynamically adjusted compression function, a dynamically adjusted compressed bits per pixel rate, a dynamically adjusted compression parameter, a dynamically adjusted frame scale factor, a dynamically adjusted frame rate, a dynamically adjusted color space, and a dynamically adjusted chroma sub-sampling rate.

The display device 300b may receive the transmitted portion of the received video data and/or may receive a corresponding transmitted residual image via the wireless link 160 at the dynamically determined new bit rate and may decompress the portion of the received video data utilizing one or more exemplary factors comprising a dynamically adjusted decompression function, a dynamically adjusted compressed bits per pixel rate, a dynamically adjusted compression parameter, a dynamically adjusted frame scale factor, a dynamically adjusted frame rate, a dynamically adjusted color space and a dynamically adjusted chroma sub-sampling rate, in accordance with corresponding dynamic adjustments in the video processing device 300b. The dynamically determined new bit rate may be determined based on one or both of variable operating conditions and information received from the display device 300b. The dynamically determined new bit rate may be determined based on one or more exemplary factors comprising a displayed video image quality, a bit error rate, a packet error rate and signal to noise ratio, that may be determined for prior transmissions via the wireless link 160. The new bit rate may be dynamically determined based on one or more of a desired level of compression for the portion of received video data, energy consumption, congestion on the wireless link 160, variable operating conditions of the wireless link 160 and capabilities of the display device 300b.

The number of pixels per frame of the portion of received video data may be scaled prior to compressing the portion of received video data in accordance with the dynamically determined new bit rate. The portion of received video data may comprise one or more of a video frame 200 and a slice 210 of contiguous horizontal rows or partial rows of pixels in the video frame 200. The portion of received video data may be compressed utilizing one or more of DPCM compression, transform compression, H.264 compression, Advanced Video Coding (AVC), compression of a residual image, and video scaling in accordance with the dynamically determined new bit rate. The display device 300b may utilize intra-frame spatial prediction. In this manner, a video processing device 300a may be operable to respond to variable and/or unpredictable operating conditions by dynamically adjusting scaling and/or compression functions and parameters.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for scalable video compression and transmission.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a video processing device that is communicatively coupled to a display device via a communication link:
receiving a first slice of contiguous horizontal rows of pixels in a video frame from a video source at a first frame size and a first number of bits per pixel;
determining that an available throughput capacity of the communication link is less than a first rate for transmission of the first slice of contiguous horizontal rows of pixels at the first frame size and first number of bits per pixel;
determining that a second rate for transmission of the first slice of contiguous horizontal rows of pixels at the first frame size and a second, lower number of bits per pixel exceeds the available throughput capacity of the communication link, the second, lower number of bits per pixel equal to a predetermined threshold;
scaling the received first slice of contiguous horizontal rows of pixels to a second, smaller frame size and reducing the number of bits per pixel of the scaled first slice of contiguous horizontal rows of pixels to a third number of bits per pixel greater than the second number of bits per pixel, responsive to the determination that the second rate for transmission utilizing the number of bits per pixel equal to the predetermined threshold exceeds the available throughput capacity of the communication link;
transmitting said scaled received first slice of contiguous horizontal rows of pixels to said display device via said communication link;
receiving a second slice of contiguous horizontal rows of pixels in the video frame from the video source at the first frame size and the first number of bits per pixel;
determining that the available throughput capacity of the communication link is greater than a third rate for transmission of the second slice of contiguous horizontal rows of pixels at the first frame size and first number of bits per pixel; and
transmitting said received second slice of contiguous horizontal rows of pixels to said display device via said communication link, the display device configured to descale the first slice and aggregate the descaled first slice with the second slice to reconstruct the video frame.

2. The method of claim 1, wherein the third number of bits per pixel is less than the first number of bits per pixel.

3. The method of claim 1, wherein scaling the received first slice of contiguous horizontal rows of pixels further comprises by performing at least one of compression and scaling at least one of said at least a portion of said received first slice of contiguous horizontal rows of pixels and a corresponding residual image, utilizing one or more of: a dynamically adjusted compression function; a dynamically adjusted compression parameter; a dynamically adjusted frame scale factor; a dynamically adjusted frame rate; a dynamically adjusted color space; and a dynamically adjusted chroma sub-sampling rate.

4. The method of claim 3, wherein said display device receives at least one of said transmitted at least a portion of said received first slice of contiguous horizontal rows of pixels and a transmitted said corresponding residual image via said communication link at said determined new bit rate and decompresses at least one of said at least a portion of said received first slice of contiguous horizontal rows of pixels and said corresponding residual image, utilizing one or more of: a dynamically adjusted decompression function; a dynamically adjusted compression parameter; a dynamically adjusted frame scale; a dynamically adjusted frame rate; a dynamically adjusted color space; and a dynamically adjusted chroma sub-sampling rate, in accordance with corresponding said dynamic adjustments in said video processing device.

5. The method of claim 1, further comprising determining the available throughput capacity of the communication link as a function of at least one of variable operating conditions or information received from said display device.

6. The method of claim 1, further comprising determining the available throughput capacity of the communication link as a function of at least one of displayed video image quality, bit error rate, or packet error rate that is determined for prior transmissions via said communication link.

7. The method of claim 1, further comprising determining the available throughput capacity of the communication link as a function of at least one of: a desired level of compression of said at least a portion of said received first slice of contiguous horizontal rows of pixels or second slice of contiguous horizontal rows of pixels; energy consumption; congestion of said communication link; variable operating conditions of said communication link; or capabilities of said display device.

8. The method of claim 1, further comprising dynamically scaling a number of pixels per frame of said at least a portion of said received first slice of contiguous horizontal rows of pixels prior to compressing said at least a portion of said received first slice of contiguous horizontal rows of pixels.

9. The method of claim 1, comprising compressing said at least a portion of said received first slice of contiguous horizontal rows of pixels utilizing one or more of DPCM compression, transform compression, H.264 compression, and Advanced Video Coding (AVC).

10. A system for communication, the system comprising:
one or more processors, one or more circuits, or any combination thereof for use in a video processing device that is communicatively coupled to a display device via a communication link, wherein said one or more processors, one or more circuits, or any combination thereof are operable to:
receive a first slice of contiguous horizontal rows of pixels in a video frame from a video source at a first frame size and a first number of bits per pixel;
determine that an available throughput capacity of the communication link is less than a first rate for transmission of the first slice of contiguous horizontal rows of pixels at the first frame size and first number of bits per pixel;
determine that a second rate for transmission of the first slice of contiguous horizontal rows of pixels at the first frame size and a second, lower number of bits per pixel exceeds the available throughput capacity of the communication link, the second, lower number of bits per pixel equal to a predetermined threshold;
scale the received first slice of contiguous horizontal rows of pixels to a second, smaller frame size and reduce the number of bits per pixel of the scaled first slice of contiguous horizontal rows of pixels to a third number of bits per pixel greater than the second number of bits per pixel, responsive to the determination that the second rate for transmission utilizing the number of bits per pixel equal to the predetermined threshold exceeds the available throughput capacity of the communication link;
transmit said scaled received first slice of contiguous horizontal rows of pixels to said display device via said communication link;
receive a second slice of contiguous horizontal rows of pixels in the video frame from the video source at the first frame size and the first number of bits per pixel;
determine that the available throughput capacity of the communication link greater than a third rate for transmission of the second slice of contiguous horizontal rows of pixels at the first frame size and first number of bits per pixel; and
transmit said received second slice of contiguous horizontal rows of pixels to said display device via said communication link, the display device configured to descale the first slice and aggregate the descaled first slice with the second slice to reconstruct the video frame.

11. The system of claim 10, wherein the third number of bits per pixel is less than the first number of bits per pixel.

12. The system of claim 10, wherein scaling the received first slice of contiguous horizontal rows of pixels further comprises by performing at least one of compression and scaling at least one of said at least a portion of said received first slice of contiguous horizontal rows of pixels and a corresponding residual image, utilizing one or more of: a dynamically adjusted compression function; a dynamically adjusted compression parameter; a dynamically adjusted frame scale factor; a dynamically adjusted frame rate; a dynamically adjusted color space; and a dynamically adjusted chroma sub-sampling rate.

13. The system of claim 12, wherein said display device receives at least one of said transmitted at least a portion of said received first slice of contiguous horizontal rows of pixels and a transmitted said corresponding residual image via said communication link at said determined new bit rate and decompresses at least one of said at least a portion of said received first slice of contiguous horizontal rows of pixels and said corresponding residual image, utilizing one or more of: a dynamically adjusted decompression function; a dynamically adjusted compression parameter; a dynamically adjusted frame scale; a dynamically adjusted frame rate; a dynamically adjusted color space; and a dynamically adjusted chroma sub-sampling rate, in accordance with corresponding said dynamic adjustments in said video processing device.

14. The system of claim 10, further comprising determining the available throughput capacity of the communication link as a function of at least one of variable operating conditions or information received from said display device.

15. The system of claim 10, further comprising determining the available throughput capacity of the communication link as a function of at least one of displayed video image quality, bit error rate, or packet error rate that is determined for prior transmissions via said communication link.

16. The system of claim 10, further comprising determining the available throughput capacity of the communication link as a function of at least one of: a desired level of compression of said at least a portion of said received first slice of contiguous horizontal rows of pixels or second slice of contiguous horizontal rows of pixels; energy consumption; congestion of said communication link; variable operating conditions of said communication link; or capabilities of said display device.

17. The system of claim 10, further comprising dynamically scaling a number of pixels per frame of said at least a portion of said received first slice of contiguous horizontal rows of pixels prior to compressing said at least a portion of said received first slice of contiguous horizontal rows of pixels.

18. The system of claim 10, comprising compressing said at least a portion of said received first slice of contiguous horizontal rows of pixels utilizing one or more of DPCM compression, transform compression, H.264 compression, and Advanced Video Coding (AVC).

19. The method of claim 10, wherein transmitting said scaled received first slice of contiguous horizontal rows of pixels to said display device via said communication link further comprises:
transmitting a command to a decompressor of said display device to disable inter-frame prediction for the video frame, responsive to the determination that the second rate for transmission utilizing the number of bits per pixel equal to the predetermined threshold exceeds the available throughput capacity of the communication link.

20. The method of claim 10, further comprising:

generating a residual image from a difference between the received first slice and received second slice, and the scaled first slice and received second slice;

compressing the residual image; and transmitting the residual image to said display device, the display device decompressing the residual image and adding the residual image to the reconstructed video frame.

* * * * *